United States Patent
Ha et al.

(10) Patent No.: US 6,501,519 B2
(45) Date of Patent: Dec. 31, 2002

(54) TRANSFLECTIVE LIQUID CRYSTAL DISPLAY DEVICE

(75) Inventors: Kyoung-Su Ha, Seoul (KR); Yong-Beom Kim, Kyonggi-do (KR); Ik-Soo Kim, Kyonggi-do (KR); Heume-Il Baek, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 40 days.

(21) Appl. No.: 09/736,309

(22) Filed: Dec. 15, 2000

(65) Prior Publication Data

US 2001/0022638 A1 Sep. 20, 2001

(30) Foreign Application Priority Data

Dec. 21, 1999 (KR) .............................................. 99-59600

(51) Int. Cl.[7] .............................................. G02F 1/1368
(52) U.S. Cl. .............................. 349/43; 349/139; 257/72
(58) Field of Search ........................ 349/12, 119, 138, 349/117, 43, 151; 257/72; 438/648; 359/70

(56) References Cited

U.S. PATENT DOCUMENTS 6,281,952 B1 * 8/2001 Okamoto et al. .............. 349/12
6,335,276 B1 * 1/2002 Park et al. ................... 438/648
6,355,942 B1 * 3/2002 Yamakazi et al. ............. 257/72

* cited by examiner

Primary Examiner—William L. Sikes
Assistant Examiner—P. R. Akkapeddi
(74) Attorney, Agent, or Firm—Birch, Stewart, Kolasch & Birch, LLP (57) ABSTRACT

An inventive array substrate for the transflective liquid crystal display device includes a pixel electrode, a reflective electrode, and an interposed insulation layer. When the pixel electrode is under the reflective electrode, the sum of the thickness of the insulation layer and the reflective electrode is less than 0.5 micrometers. In other embodiments, upper surfaces of the reflective and pixel electrodes are on the same plane. This results from adjusting the thickness and changing the structure such as adopting a drain supplementary electrode extended from the drain electrode of the thin film transistor or positioning the pixel electrode within the transmitting hole of the reflective electrode.

6 Claims, 12 Drawing Sheets

TRANSFLECTIVE LIQUID CRYSTAL DISPLAY DEVICE

CROSS REFERENCE

This application claims the benefit of Korean Patent Application No. 1999-59600, filed on Dec. 21, 1999, under 35 U.S.C. §119, the entirety of which is hereby incorporated by reference.

BACKGROUND OF THE INVENTION

1. Field of the Invention

The present invention relates to a liquid crystal display (LCD) device, and more particularly, to a transflective LCD device.

2. Description of Related Art

In general, liquid crystal displays are divided into transmissive LCD devices and reflective LCD devices according to whether the display uses an internal or external light source.

A typical transmissive LCD device includes a liquid crystal panel and a back light device. The liquid crystal panel includes upper and lower substrates with a liquid crystal layer interposed therebetween. The upper substrate includes a color filter, and the lower substrate includes thin film transistors (TFTs) as switching elements. An upper polarizer is arranged on the liquid crystal panel, and a lower polarizer is arranged between the liquid crystal panel and the backlight device.

Figure 1:
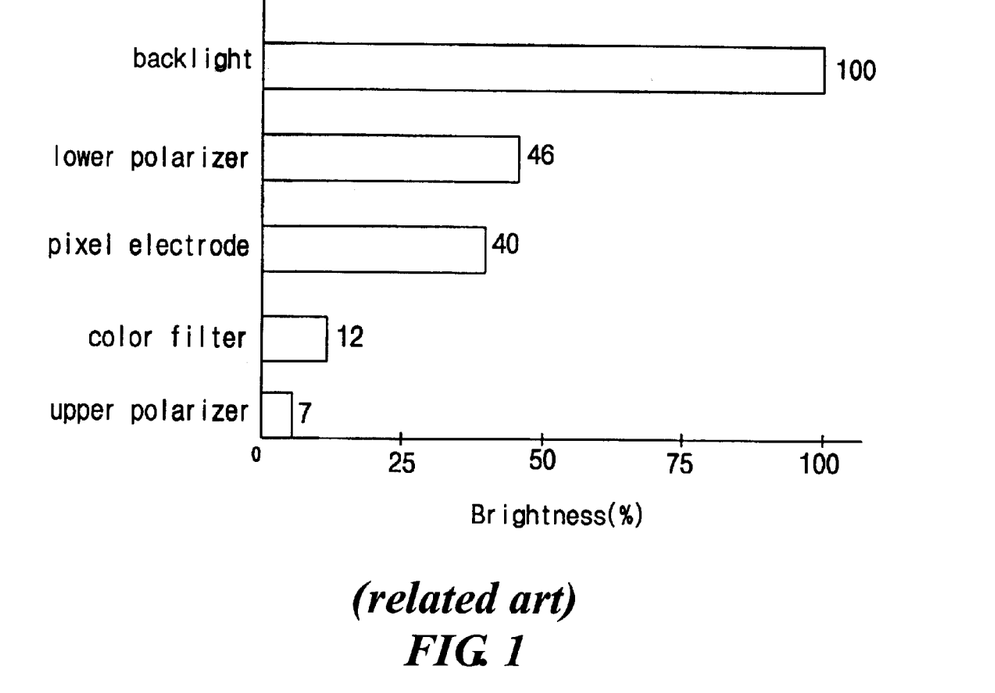
FIG. 1 is a graph illustrating transmittance after light passes through each layers of a typical transmissive LCD device.

The two polarizers have a transmittance of 45% and, the two substrates have a transmittance of 94%. The TFT array and the pixel electrode have a transmittance of 65%, and the color filter has a transmittance of 27%. Therefore, the typical transmissive LCD device has a transmittance of about 7.4% as seen in FIG. 1. FIG. 1 shows a transmittance (in brightness %) after light passes through each layer of the device. For this reason, the transmissive LCD device requires a high, initial brightness, and thus electric power consumption by the backlight device increases. A relatively heavy battery is needed to supply a sufficient power to the backlight of such a device. However, this presents a problem in that the battery can not be used for a lengthy period of time.

In order to overcome the problem described above, the reflective LCD has been developed. Since the reflective LCD device uses ambient light, it is light and easy to carry. Also, the reflective LCD device is superior in aperture ratio to the transmissive LCD device.

Figure 2:
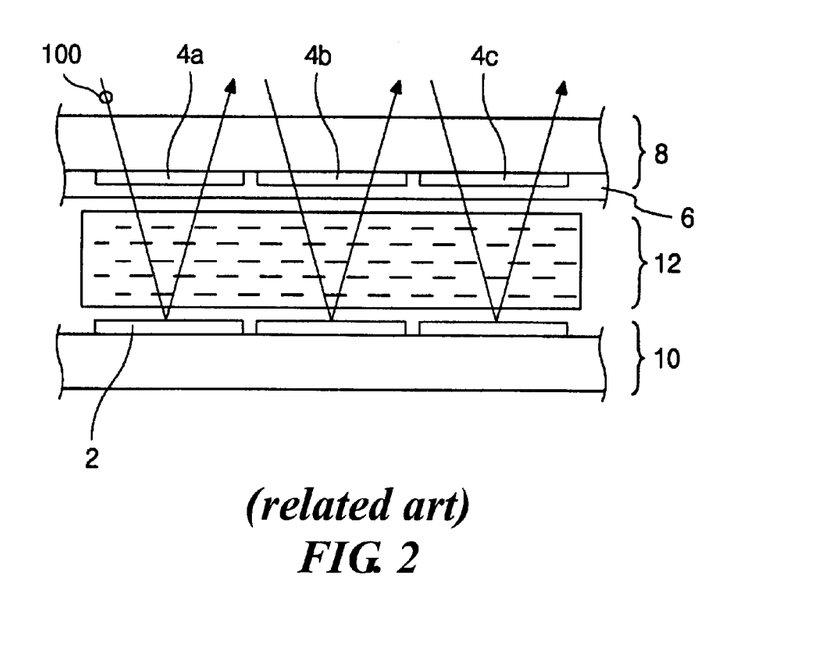
FIG. 2 is a cross-sectional view illustrating a typical reflective LCD device.

FIG. 2 shows a cross-section of a typical reflective LCD device. As shown in FIG. 2, the reflective LCD device includes upper and lower substrates 8 and 10 with a liquid crystal layer 12 interposed. The upper substrate 8 includes color filter layers 4a, 4b and 4c (e.g., red, green, and blue) and a common electrode 6. The lower substrate 10 includes a switching element (not shown) and a reflective electrode 2.

Ambient light 100 passes through the upper substrate 8 and the liquid crystal layer 12 and is reflected on the reflective electrode 2. When electrical signals are applied to the reflective electrode 2 by the switching element, the phase of the liquid crystal layer 12 varies. Then, reflected light is colored by the color filter layers 4a, 4b and 4c and displayed in the form of images.

However, the reflective LCD device is affected by its surroundings. For example, the brightness of ambient light in an office differs largely from the light outdoors. Even in the same location, the brightness of ambient light depends on the time of day (e.g., noon or dusk).

Figure 3:
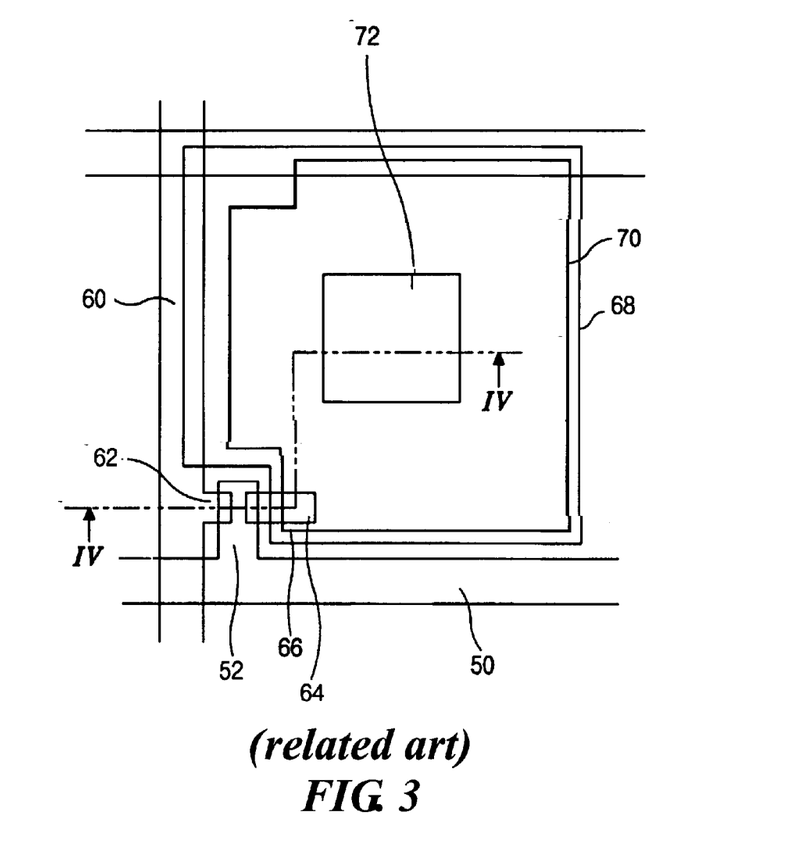
FIG. 3 is a plan view illustrating a conventional transflective LCD device.

In order to overcome the problems described above, a transflective LCD device has been developed. FIG. 3 shows a conventional transflective LCD device. As shown in FIG. 3, the conventional transflective LCD device includes a gate line arranged in a transverse direction and a gate electrode 52 extended from the gate line 50. A data line is formed in the direction perpendicular to the gate line 50. A source electrode 62 extended from the data line 60 is overlapped with the gate electrode 52.

A drain electrode 64 is formed spaced apart from the source electrode 62. The drain electrode 64 contacts the pixel portions 68 and 70 formed of different materials, via a contact hole 66. The pixel portions have a reflective electrode 68 of substantially non transparent material and a pixel electrode 70 of transparent conducting material. The reflective electrode 68 includes a transmitting hole 72, which can have a rectangular shape. The pixel electrode 70 is larger than the transmitting hole 72 of the reflective electrode 68.

Figure 4A:
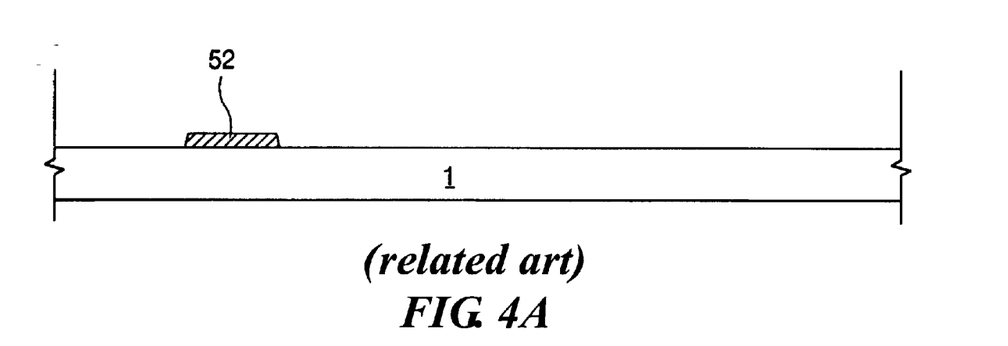
FIGS. 4A to 4D are cross-sectional views taken along line IV—IV of FIG. 3 and illustrate a manufacturing process of the conventional transflective LCD device.

FIGS. 4A to 4D illustrate manufacturing process in cross section taken along line IV—IV of FIG. 3. FIG. 4A shows a gate electrode 52 on the substrate 1. The gate electrode 52 is made of a material chosen from tungsten(W), Chrome (Cr), or aluminum alloy.

Figure 4B:
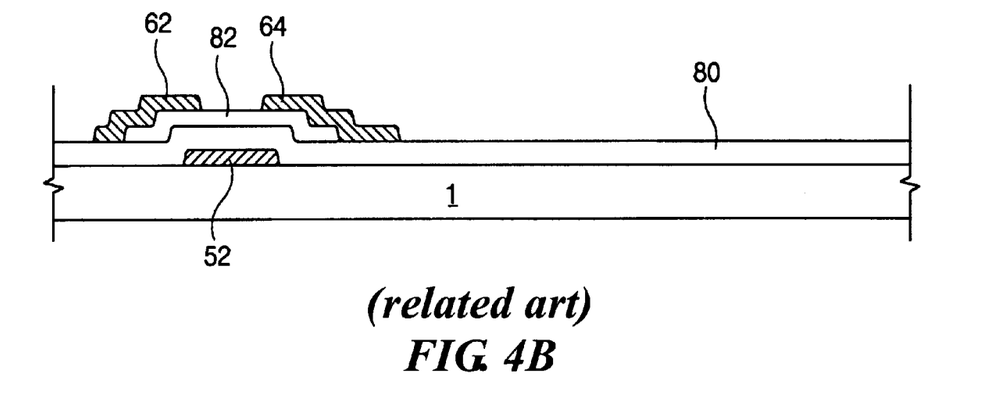

FIG. 4B shows a gate insulation layer 80 and the semiconductor layer 82 and source and drain electrodes 62 and 64 stacked in this order.

Figure 4C:
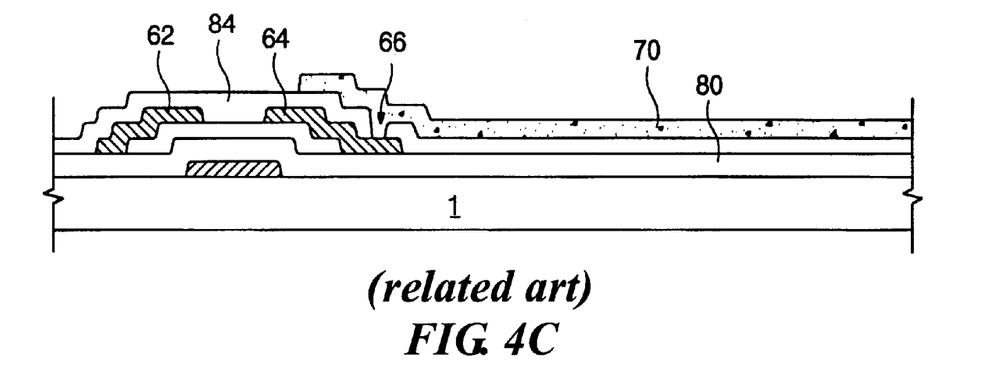

FIG. 4C shows a protection layer 84 on the source and drain electrodes 62 and 64. The protection layer 84 has a drain contact hole 66 at a corresponding position of the drain electrode 64. The protection layer is made of a material chosen from silicon nitride, silicon oxide, and so on. The pixel electrode 70 is formed on the protection layer 84. The pixel electrode 70 has indium tin oxide and contacts the drain electrode 64 via the drain contact hole 66.

Figure 4D:
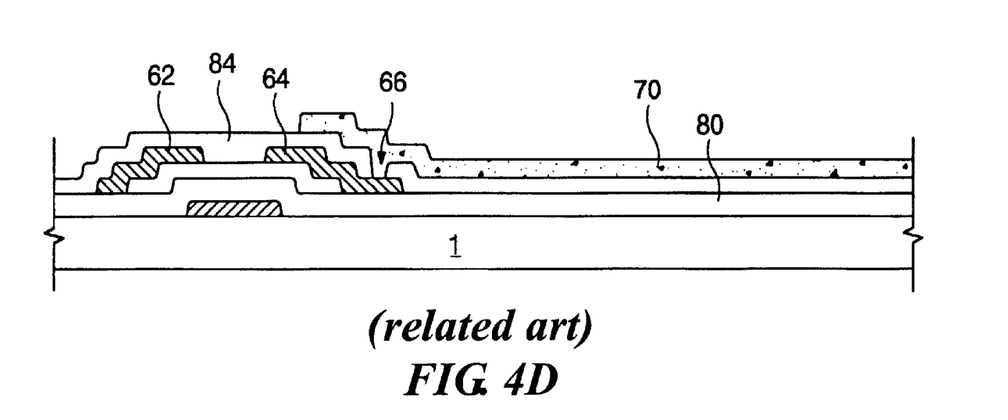

FIG. 4D shows formation of a reflective electrode 68. An insulation layer 86 of benzocyclobutene (BCB) is deposited on the pixel electrode 70 and patterned to expose a portion of the pixel electrode 70 near the drain contact hole 66. Afterwards, the reflective electrode 68 is formed on the insulation layer 86.

Figure 5:
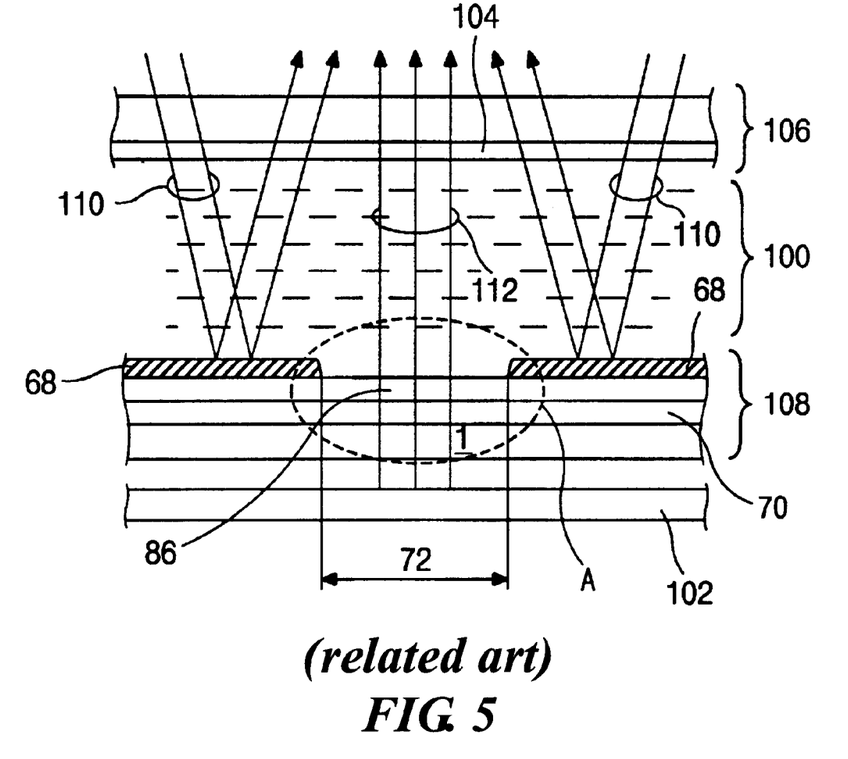
FIG. 5 is a cross-sectional view in order to explain the operation of the conventional transflective LCD device.

FIG. 5 schematically shows a transflective LCD device in cross section. The portion of the transmitting hole, the pixel electrode and the reflective electrode are emphasized in the drawing.

The transflective LCD device in FIG. 5 is operable in transmissive and reflective modes. First, in reflective mode, the incident light 110 from the upper substrate 106 is reflected on the reflective electrode 68 and directed toward the upper substrate 106. At this time, when electrical signals are applied to the reflective electrode 68 by the switching element (not shown), phase of the liquid crystal layer 100 varies and thus the reflected light is colored by the color filter 104 and displayed in the form of images.

Further, in transmissive mode, light 112 generated from the backlight device 102 passes through portions of the pixel electrode 70 corresponding to the transmitting holes 72. When the electrical signals are applied to the pixel electrode 70 by the switching element (not shown), phase of the liquid crystal layer 100 varies. Thus, the light 112 passing through the liquid crystal layer 100 is colored by the color filter 104 and displayed in the form of images.

As described above, since the transflective LCD device has both transmissive and reflective modes, the transflective LCD device can be used without regard to the time of day (e.g., noon or dusk). It also has the advantage that it can be used for a long time by consuming low power.

Figure 6:
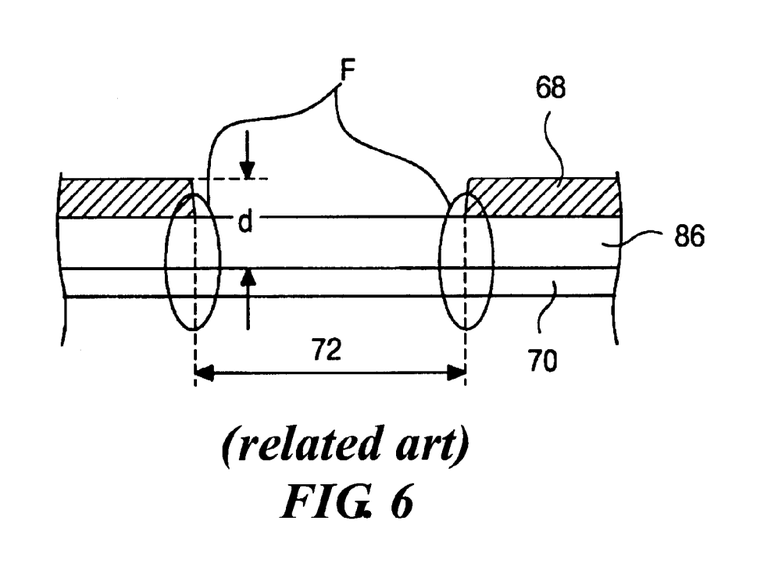
FIG. 6 is an enlarged view of "A" portion of FIG. 5.

FIG. 6 is an enlarged view of "A" portion of FIG. 5. Distance between the upper surface of the pixel electrode 70 and the upper surface of the reflective electrode 68 is designated as "d", which is caused mainly by the insulation layer 86. Since an equipotential surface is formed along surfaces of the electrodes, distortion occurs in the electric field at the interface portion "F" of the two electrodes 68 and 70.

Figure 7:
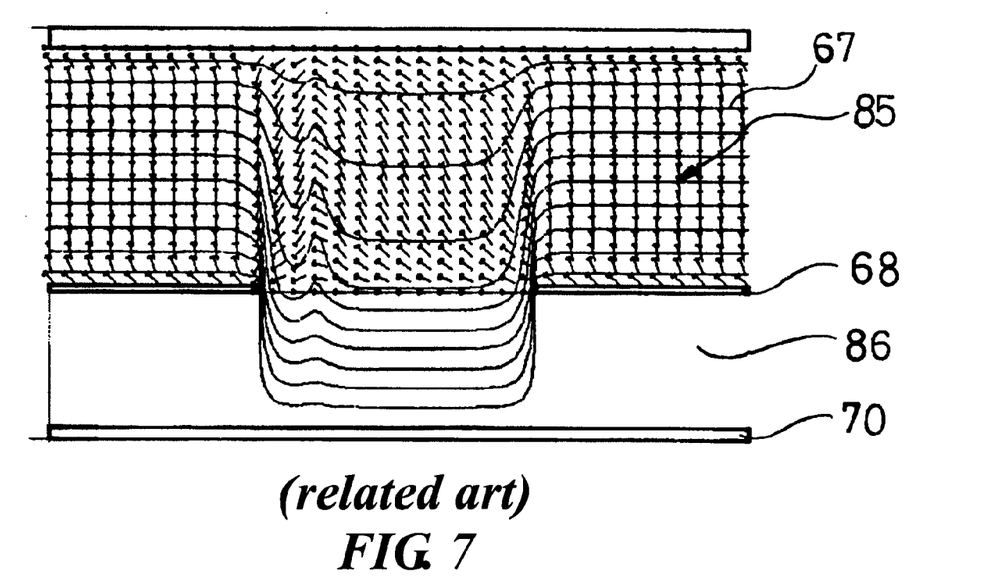
FIG. 7 is a graph illustrating electric fields as a result of a simulation.
Figure 8A:
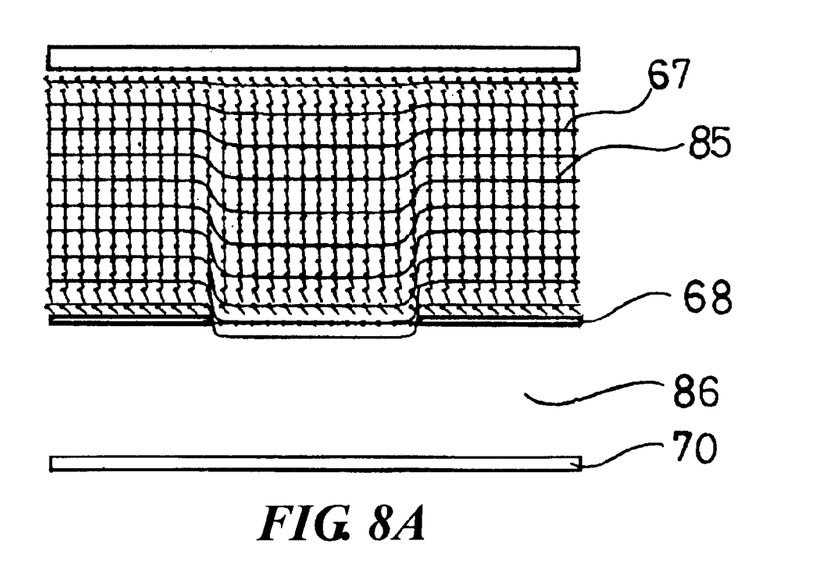
FIGS. 8A to 8D are similar graph illustrating changes of the electric fields according to change of the thickness of the insulation layer shown in FIG. 6.
Figure 8B:
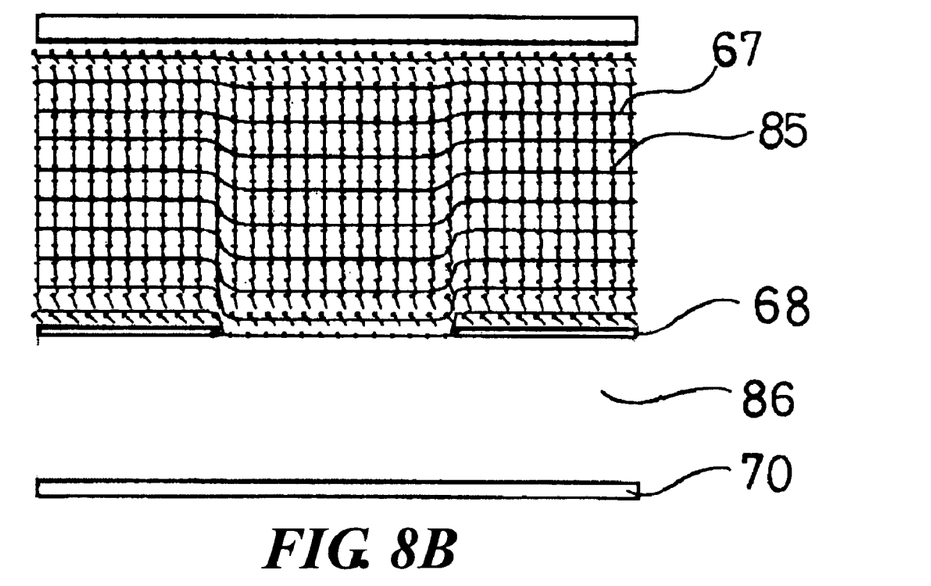
Figure 8C:
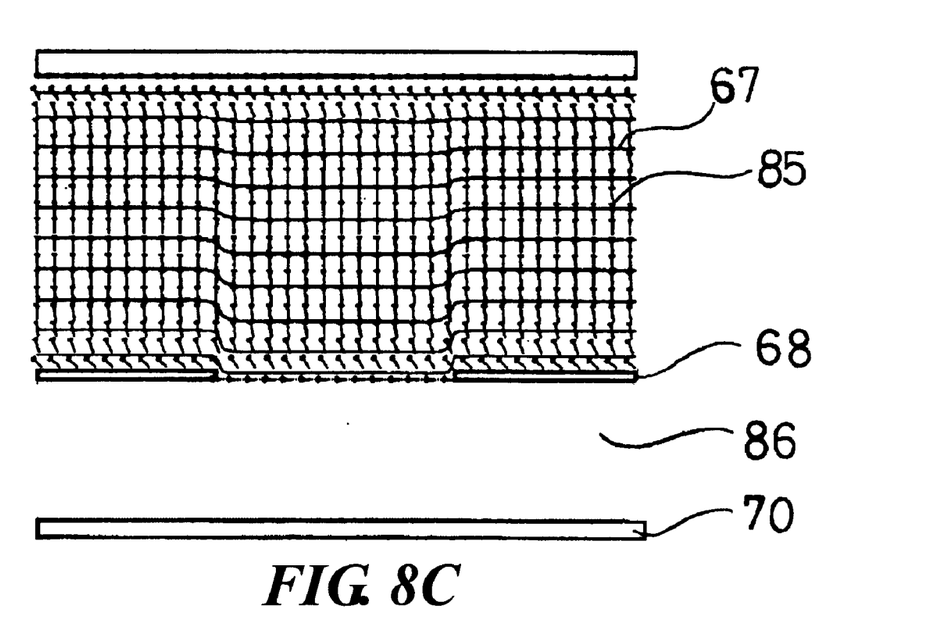
Figure 8D:
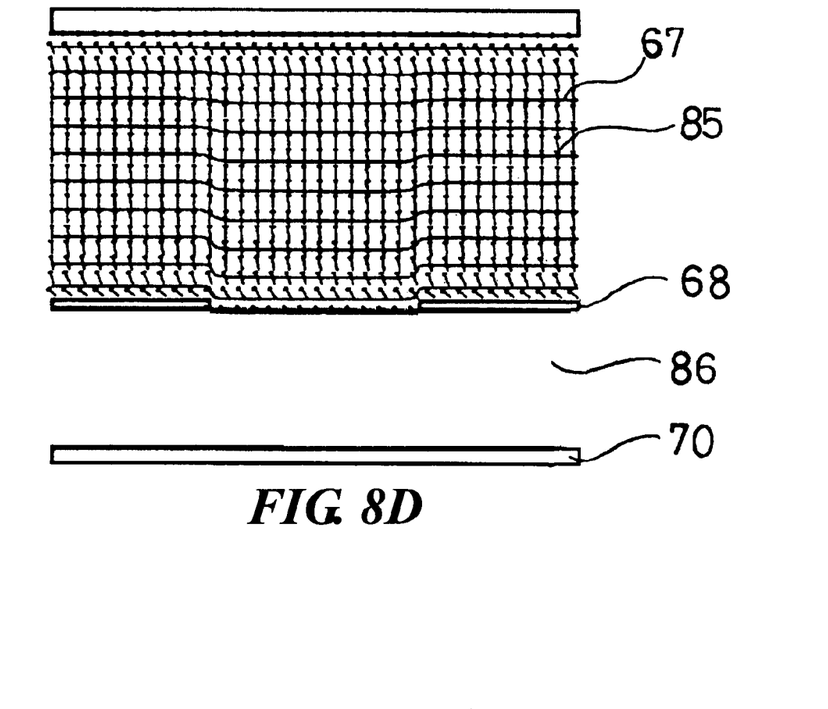

FIG. 7 illustrates a simulation graph showing equipotential lines and the direction of liquid crystal molecules in case of adopting the insulation layer 86 of 2 $\mu$m. The simulation result reveals that the electric fields are much in disarray near the interface between the reflective and pixel electrodes 68 and 70. The liquid crystal molecules in the transmitting hole 72 do not have a uniform arrangement direction 85, which is mainly affected by the equipotential line 67. In a case of dark lighting conditions, since the arrangement of the liquid crystal molecules in the transmitting hole or portion 72 does not have symmetry and uniformity, the light from a back light device which leaks out though an optimized polarizer is adopted, resulting in a lowering of the contrast ratio.

SUMMARY OF THE INVENTION

Accordingly, the present invention is directed to a transflective liquid crystal display device that substantially obviates one or more of the problems due to limitations and disadvantages of the related art.

It is an object of the invention to provide a transflective LCD device having an improved contrast ratio.

In accordance with the purpose of the invention, as embodied and broadly described, in one aspect the invention provides an array substrate for a transflective LCD device including a substrate; a thin film transistor having gate, source and drain electrodes on the substrate; a protection layer on the thin film transistor and the substrate; a pixel electrode on the protection layer, the pixel electrode contacting the drain electrode of the thin film transistor; a reflective electrode contacting the drain electrode, the reflective electrode having a first transmitting hole; an insulation layer having a thickness between the pixel and reflective electrodes, the insulation layer having a second transmitting hole corresponding to the first transmitting hole; and wherein a distance between upper surfaces of the reflective and pixel electrodes is less than 0.5 micrometers.

In another aspect, the invention includes an array substrate of a transflective liquid crystal display device, including: a substrate having a switching region and a display region; a thin film transistor on the switching region of the substrate, the transistor having gate, source, and drain electrodes; a drain supplementary electrode extended from the drain electrode to the display region of the substrate; a protection layer covering the transistor and the drain supplementary electrode and having a first drain contact hole exposing a portion of the drain supplementary electrode; a pixel electrode on the display region of the substrate, the pixel electrode contacting the drain supplementary electrode via the first drain contact hole; an insulation layer on the pixel electrode and covering the transistor, the insulation layer having a second drain contact hole exposing a portion of the drain electrode; and a reflective electrode on the insulation layer, the reflective electrode contacting the drain electrode via the second drain contact hole, having a transmitting hole exposing the insulation layer over the display region of the substrate, and having a thickness such that sum of the thickness of the insulation layer and the thick of the reflective electrode is substantially the same as the thickness of the pixel electrode.

The upper surface of the reflective electrode and that of the pixel electrode can be in the same plane.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to preferred embodiments of the present invention, examples of which are illustrated in the accompanying drawings.

Using the same process disclosed in FIG. 7, FIGS. 8A to 8D results of simulations in cases wherein the thicknesses of the insulation layer 86 is 0.4, 0.2, 0.1 and 0.05 μm, respectively when the thickness of the reflective electrode is 0.1 micrometer. The results of the simulations show that the electric field becomes more stable, as the thickness of the insulation layer 86 becomes smaller.

Figure 9:
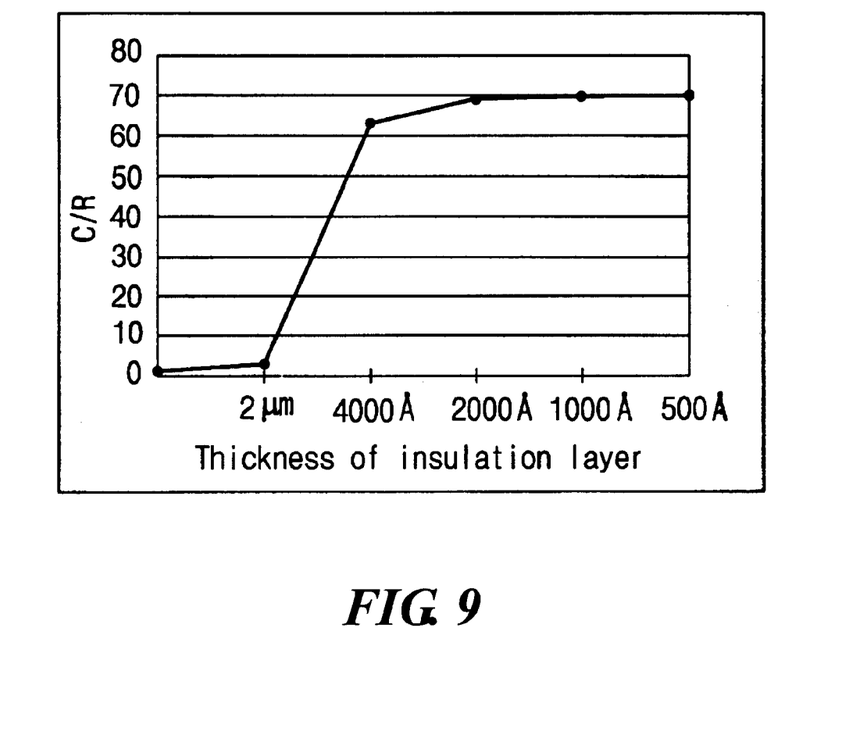
FIG. 9 is a graph illustrating change of the contrast ratio according to the thickness of the insulation layer shown in FIG. 6.

FIG. 9 is a graph illustrating change of the contrast ratio (C/R) in relation to the thickness of the insulation layer between two electrodes 68 and 70 when a thickness of the reflective electrode is 0.1 micrometer. As shown in FIG. 9, the C/R decreases steeply when the thickness of the insulation layer is over 400 nm (0.4 micrometers). On the contrary, when the thickness of the insulation layer is below 0.4 micrometer, C/R is not so much affected.

Thus, the invention is directed toward reducing the distance between the pixel electrode and the reflective electrode to less than 0.5 micrometers.

Figure 10:
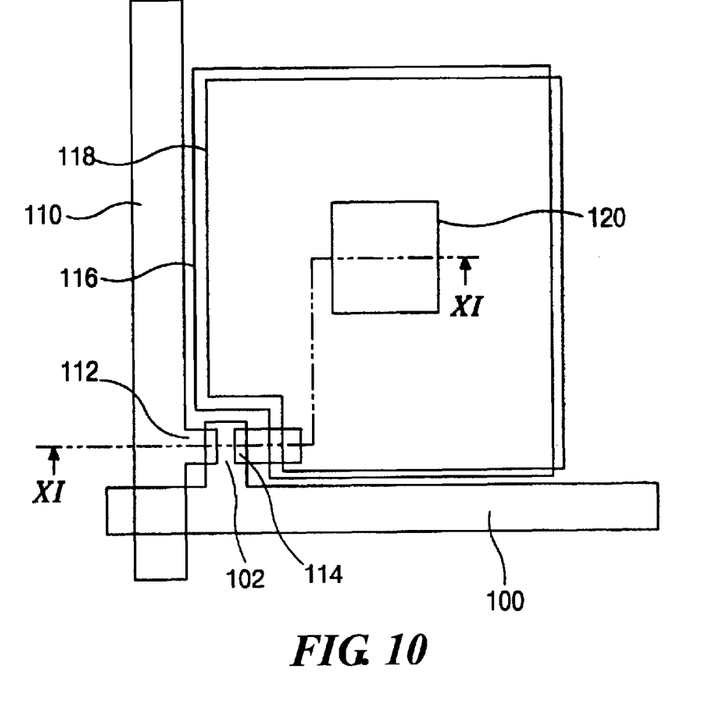
FIG. 10 is a plan view showing an array substrate of a transflective LCD device according to a first embodiment of the invention.

FIG. 10 is a plan view illustrating a configuration corresponding to one pixel of an array substrate of a transflective LCD device according to a preferred embodiment of the present invention. A gate line 100 having a gate electrode 102 extended and protruded from the gate line 100 is arranged in a transverse direction. A data line 110 is arranged in a longitudinal direction and has a source electrode 112 extended toward the gate electrode 102. The drain electrode 114 is formed spaced apart from the source electrode 112. A reflective electrode 118 contacts the drain electrode 114 and has a transmitting hole 120. The reflective electrode 118 is made of non transparent material. A pixel electrode 116 contacts the drain electrode 114 and is made of a transparent material. The reflective and pixel electrodes 118 and 116 can contact the drain electrode 114 independently or via the same contact hole. The pixel electrode 116 is positioned in the transmitting hole 120 of the reflective electrode 118 and the area of the pixel electrode 116 can be smaller than that of the reflective electrode 118.

Figure 11:
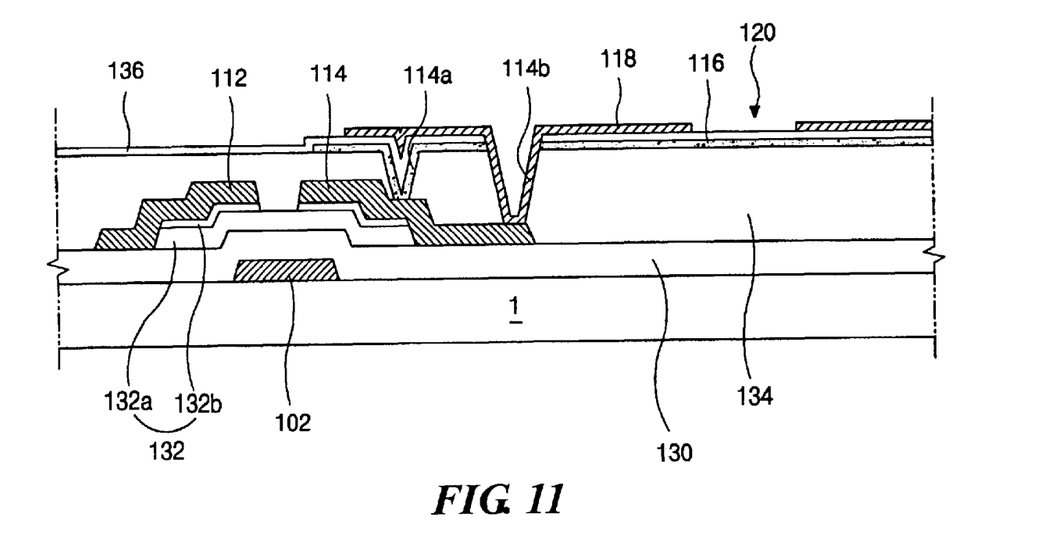
FIG. 11 is a cross-sectional view taken along line XI—XI of FIG. 10.

FIG. 11 is a cross-sectional view taken along line XI—XI of FIG. 10. Each step of the manufacturing process of the array substrate according to the embodiment of the invention is similar to those of FIGS. 4A to 4D, but the structure is different.

On the substrate 1 are sequentially formed a gate electrode 102 and a gate insulation layer 130.

An active layer 132 is formed on the gate insulation layer 130 over the gate electrode 102. The active layer 132 includes a pure semiconductor layer 132a and an ohmic contact layer 132b. Next, the source and drain electrodes 112 and 114 contacting the active layer 132 are formed.

On the source and drain electrodes 112 and 114, a protection layer 134 is formed. The protection layer having a first drain contact hole 122 for electric contact with the pixel electrode 116 that is formed later. As a protection layer 134 silicon nitride, silicon oxide or BCB can be used.

On the pixel electrode 116, an insulation layer 136 is formed and patterned with the protection layer 134 and the pixel electrode 116 in order to form a second drain contact hole 124 to connect the drain electrode 114 and the reflective electrode 118 that is formed later on the insulation layer 136. The reflective electrode 118 has a transmitting hole 120 to expose the insulation layer 136. For the insulation layer 136, silicon nitride or silicon oxide can be used. At this time in order to improve the contrast ratio of the transflective LCD device, the thickness of the insulation layer 136 is below 1 micrometer. That is, if the distance between the upper surfaces of the pixel and reflective electrodes is below 1 micrometer, the contrast ratio of the transflective LCD device can be about 70:1.

For the modification the positions of the pixel electrode 116 and the reflective electrode 118 can be changed.

Figure 12:
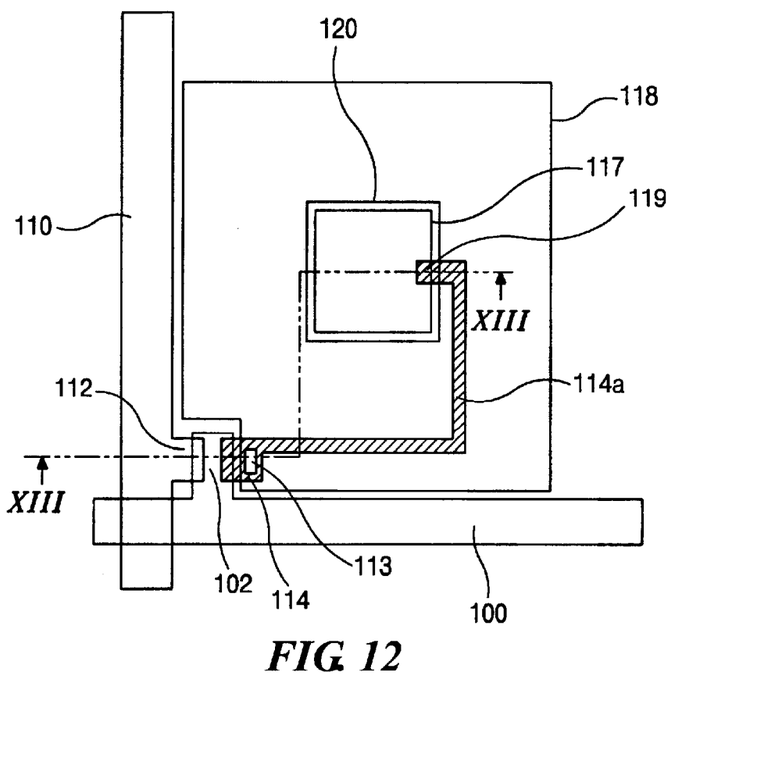
FIG. 12 is a plan view illustrating an array substrate of a transflective LCD device according to second and third embodiments of the invention.

FIG. 12 is a plan view illustrating an array substrate according to the second embodiment of the invention and is similar to that shown in FIG. 10. The difference is that the pixel electrode 117 is inside the transmitting hole 120 and the drain electrode 114 contacting the reflective electrode 118 via the third drain contact hole 113 is extended to the pixel electrode 117 at the transmitting hole 120. That is, the pixel electrode 117 contacts a drain supplementary electrode 114a extended to the transmitting hole 120 via the fourth drain contact hole 119.

Figure 13A:
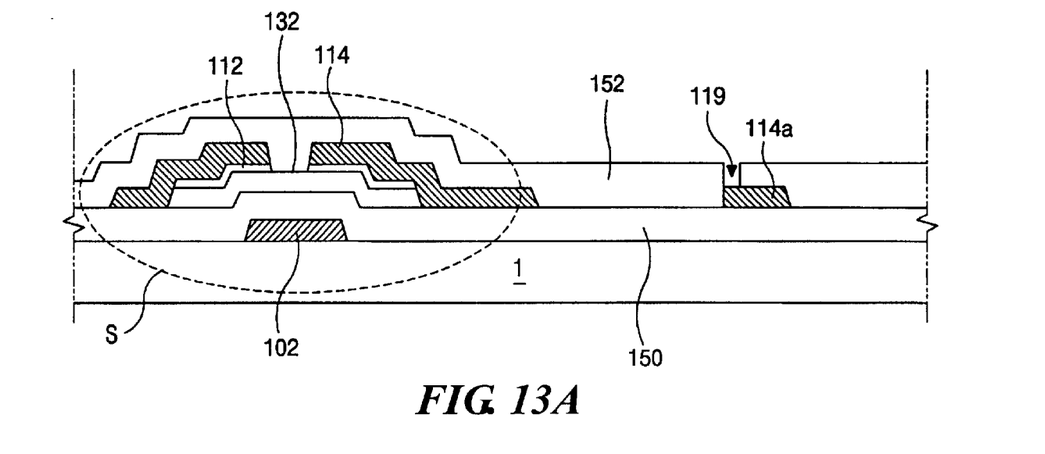
FIGS. 13A to 13C are cross-sectional view taken along line XIII—XIII of FIG. 12 and illustrate a manufacturing process of an array substrate of the LCD device according to the second embodiment of the invention.
Figure 13B:
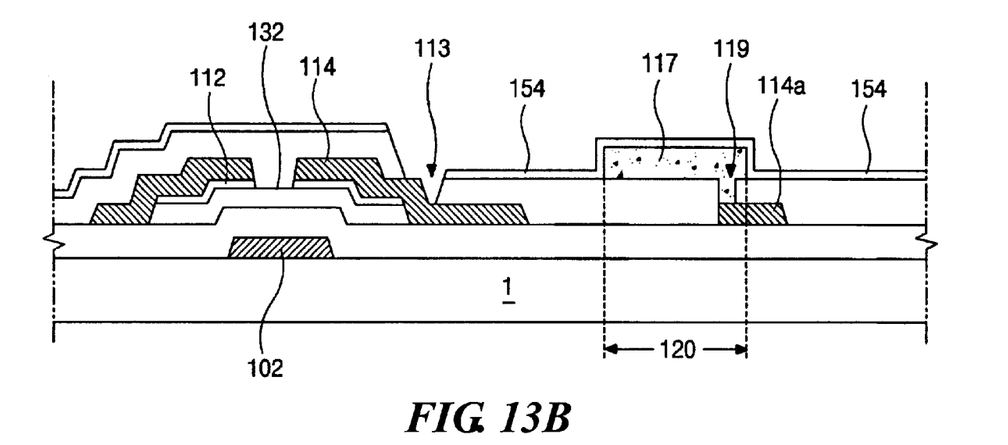
Figure 13C:
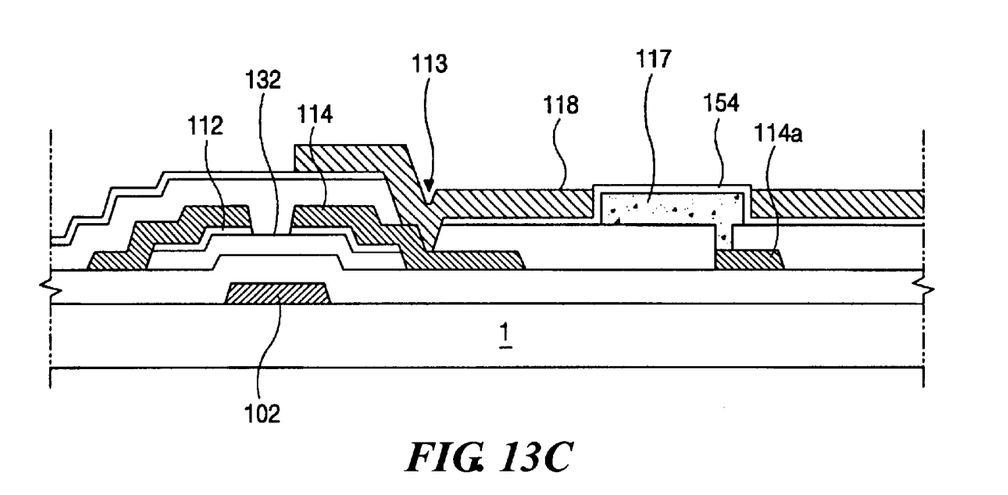

FIGS. 13A to 13C illustrate the manufacturing process according to the second embodiment of the invention. As shown in FIG. 13A, a thin film transistor "S" is formed on the substrate 1. The thin film transistor "S" includes a gate electrode 102, a gate insulation layer 150, and source and drain electrodes 112 and 114. The drain electrode 114 is extended to define a drain supplementary electrode 114a having the fourth drain contact hole 119. On the transistor "S", a protection layer 152 is formed.

FIG. 13B shows a step of forming the pixel electrode 117, which is formed inside a transmitting hole 120 that will be formed later in the reflective electrode 118 (see FIG. 12). The pixel electrode 117 contacts the drain supplementary electrode 114a via the fourth drain contact hole 119. Next, an insulation material is deposited and patterned to form the insulation layer 154 having the third drain contact hole 113 exposing the drain electrode 114. At this time, the pixel electrode 117 can be exposed with the drain electrode 114 when forming the third drain contact hole 113.

FIG. 13C shows a step of forming the reflective electrode 118. The reflective electrode 118 contacts the drain electrode 114 via the third drain contact hole 113 and is insulated from the pixel electrode 117 by the insulation layer 154. The thickness' of the reflective electrode 118 and the pixel electrode 116 are determined such that sum of the thickness' of the insulation layer 154 and the reflective electrode 118 is substantially same as that of the pixel electrode 117. Thus, the upper surface of the reflective electrode 118 and that of the pixel electrode 117 is on the same plane, leading to improvement of the contrast ratio due to the minimum distortion of the electric field in the interface between the pixel and reflective electrodes 117 and 118. Thus, in forming the pixel electrode 117, the thickness' of the insulation layer 154 and the reflective electrode 118 are necessarily considered. The reflective electrode 119 has non-transparent material, whereas the pixel electrode 117 has a transparent material such as indium tin oxide or indium zinc oxide.

The array substrate according to the third embodiment of the invention is manufactured through a different process from that shown in FIGS. 13A to 13C. In this embodiment, the reflective electrode is formed in advance to the pixel electrode.

Figure 14A:
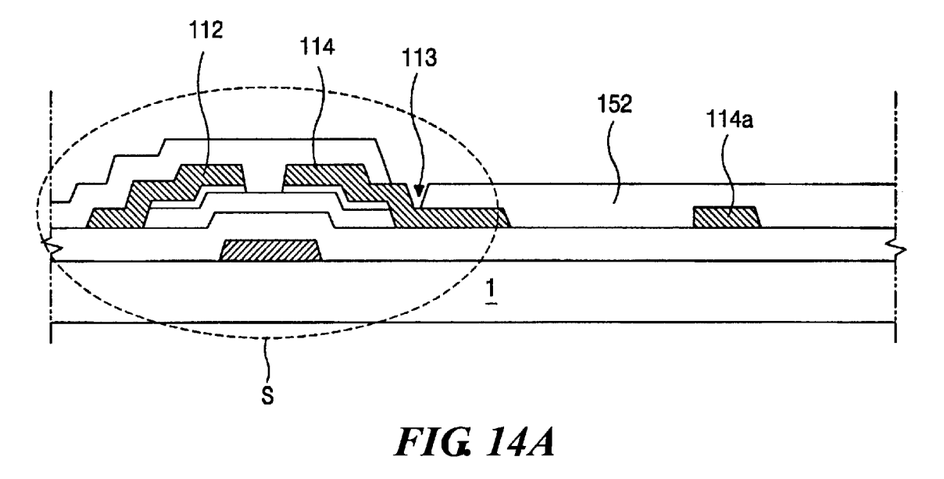
FIGS. 14A to 14C are cross-sectional view taken along line XIII—XIII of FIG. 12 and illustrate a manufacturing process of an array substrate of the LCD device according to the third embodiment of the invention.
Figure 14B:
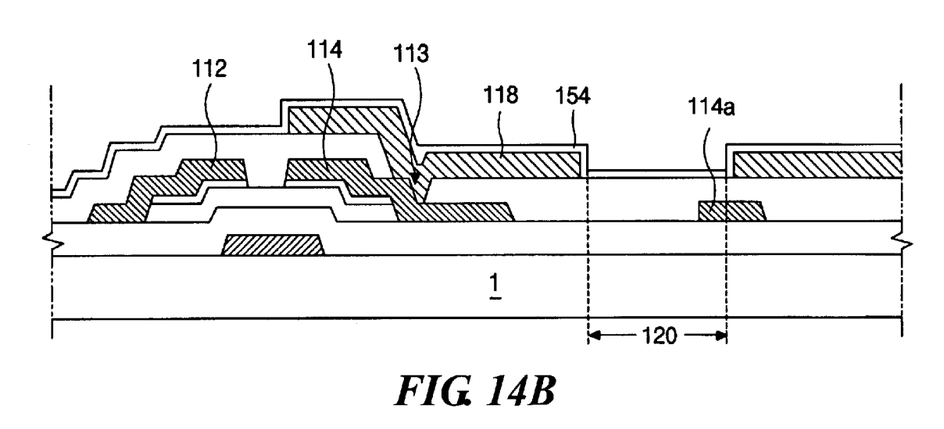
Figure 14C:
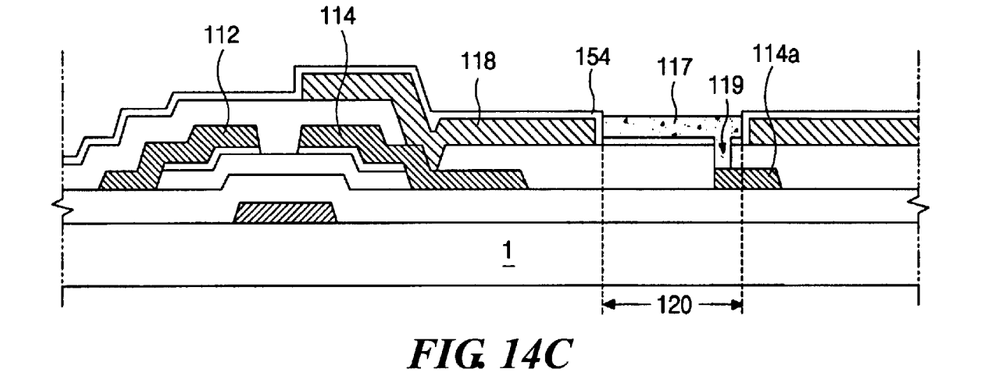

FIGS. 14A to 14C show the manufacturing process of the array substrate according to the third embodiment of the invention. As shown in FIG. 14A, a protection layer 152 is formed on the thin film transistor "S" and patterned to form the third drain contact hole 113 exposing a portion of the drain electrode 114.

The drain supplementary electrode 114a is also formed at the same time the drain electrode 114 as in the second embodiment.

FIG. 14B shows a step of forming a reflective electrode 118 on the protection layer 152. The reflective electrode 118 is patterned to form a transmitting hole 120 exposing a portion of the drain supplementary electrode 114a and contacts the drain electrode 114 via the third drain contact hole 113.

On the reflective electrode 119, the insulation layer 154 is formed. The insulation layer 154 has the fourth drain contact hole 119 exposing the drain supplementary electrode 114a.

FIG. 14C shows a step of forming the pixel electrode 117. The pixel electrode 117 is formed inside the transmitting hole 120 of the reflective electrode 118. The pixel electrode 117 contacts the drain supplementary electrode 114a via the fourth drain contact hole. The thickness of the pixel electrode is determined such that the upper surface of the pixel electrode 117 is on the same plane with the upper surface of the reflective electrode 118. That is, the thickness of the reflective electrode is sum of the thickness' of the pixel electrode 117 and the insulation layer 154.

As described herein before, using the array substrate for a transflective LCD device according to the preferred embodiment of the present invention, since uniformity of the electric field applied to the liquid crystal material is improved, good contrast ratio can be achieved.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An array substrate for a transflective LCD device, comprising:

a substrate;

a thin film transistor having gate, source and drain electrodes on the substrate;

a protection layer covering the thin film transistor;

a pixel electrode on the protection layer, the pixel electrode contacting the drain electrode of the thin film transistor;

a reflective electrode contacting the drain electrode, the reflective electrode having a first transmitting hole; and an insulation layer having a thickness between the pixel and reflective electrodes, the insulation layer having a second transmitting hole corresponding to the first transmitting hole to expose a portion of the pixel electrode, wherein a height from a top surface of the pixel electrode to a top surface of the reflective electrode is less than 0.5 micrometers, thereby causing distortion of an electric field over the first transmitting hole to be minimized.

2. An array substrate of a transflective liquid crystal display device, comprising:

a substrate having a switching region and a display region;

a thin film transistor on the switching region of the substrate, the thin film transistor having gate, source, and drain electrodes;

a drain supplementary electrode extended from said drain electrode to the display region of the substrate;

a protection layer covering the thin film transistor and the drain supplementary electrode and having a first drain contact hole exposing a portion of the drain supplementary electrode;

a pixel electrode on the protection layer at the display region of the substrate, the pixel electrode contacting the drain supplementary electrode via the first drain contact hole;

an insulation layer on the pixel electrode, the insulation layer covering the thin film transistor, wherein a second drain contact hole is formed in both the protection layer and the insulating layer to the drain electrode; and a reflective electrode on the insulation layer, the reflective electrode contacting the drain electrode via the second drain contact hole, having a transmitting hole exposing the insulation layer over the display region of the substrate, and having a thickness so that a sum of the thicknesses of the insulation layer and the reflective electrode is substantially the same as the thickness of the pixel electrode.

3. The array substrate of claim 2, wherein an upper surface of the reflective electrode and an upper surface of the pixel electrode are on the same plane.

4. An array substrate of a transflective liquid crystal display device, comprising:

a substrate having a switching region and a display region;

a thin film transistor on the switching region of the substrate, the thin film transistor having gate, source, and drain electrodes;

a drain supplementary electrode extended from said drain electrode to the display region of the substrate;

a protection layer covering the thin film transistor and the drain supplementary electrode and having first and second drain contact holes exposing portions of the drain electrode and the drain supplementary electrode, respectively;

a reflective electrode on the protection layer at the display region of the substrate, the reflective electrode contacting the drain electrode via the first drain contact hole of the protection layer and having a transmitting hole exposing a portion of the protection layer; and an insulation layer on the reflective electrode, the insulation layer having a third drain contact hole corresponding to the second drain contact hole of the protection layer to expose the portion of the drain supplementary electrode; and a pixel electrode on the insulation layer, the pixel electrode contacting the drain supplementary electrode via the second and third drain contact holes of the protection layer and the insulation layer, respectively, an upper surface of the reflective electrode and that of the pixel electrode being on the same plane.

5. The array substrate of claim 4, wherein the pixel electrode is within the transmitting hole of the reflective electrode.

6. The array substrate of claim 5, wherein a thickness of the reflective electrode is the same as the sum of the thicknesses of the pixel electrode and the insulation layer.

* * * * *